United States Patent [19]

Kahlbaugh et al.

[11] Patent Number: 5,082,476
[45] Date of Patent: Jan. 21, 1992

[54] FILTRATION ARRANGEMENT AND METHOD

[75] Inventors: Brad E. Kahlbaugh, Roseville; Susan B. Reinhart, Minneapolis; Denis J. Dudrey, Bloomington; John T. Herman, Dellwood, all of Minn.

[73] Assignee: Donaldson Company, Inc., Minneapolis, Minn.

[21] Appl. No.: 601,242

[22] Filed: Oct. 19, 1990

[51] Int. Cl.$^5$ ............................................. B01D 46/10
[52] U.S. Cl. ............................................. 55/97; 55/320; 55/486; 55/487; 55/498; 55/509; 55/510
[58] Field of Search .............. 55/97, 320, 321, 322, 55/323, 487, 498, 502, 510, 514, 518, 519, 521, 486

[56] References Cited

U.S. PATENT DOCUMENTS

| | | |
|---|---|---|
| 1,743,675 | 3/1923 | Jordahl . |
| 1,771,639 | 3/1923 | Jordahl . |
| 2,174,528 | 10/1939 | Prentiss . |
| 2,334,840 | 6/1940 | Punton et al. . |
| 2,918,138 | 2/1957 | Lewis . |
| 2,966,960 | 12/1958 | Rochlin . |
| 3,290,870 | 11/1963 | Jensen . |
| 3,298,149 | 3/1964 | Sobeck . |
| 3,417,551 | 11/1965 | Bonell . |
| 3,552,553 | 1/1971 | Reading . |
| 3,680,659 | 8/1972 | Kasten . |
| 3,727,769 | 4/1973 | Scholl . |
| 3,766,629 | 10/1973 | Lechtenberg . |
| 3,822,531 | 7/1974 | Wisnewski et al. . |
| 3,918,945 | 11/1975 | Holloway et al. . |
| 3,990,333 | 11/1976 | Davis . |
| 4,074,985 | 2/1978 | Willas . |
| 4,086,070 | 4/1978 | Argo et al. .................. 55/97 |
| 4,093,437 | 6/1978 | Ichihara et al. ............. 55/487 |
| 4,102,785 | 7/1978 | Head et al. .................. 55/487 X |
| 4,233,042 | 11/1980 | Tao . |
| 4,314,832 | 2/1982 | Fox ............................ 55/498 X |
| 4,322,230 | 3/1982 | Schoen et al. . |
| 4,536,440 | 8/1985 | Berg .......................... 55/487 X |
| 4,619,674 | 10/1986 | Erdmannsdorfer . |
| 4,629,483 | 12/1986 | Stanton . |
| 4,647,373 | 3/1987 | Tokar et al. . |
| 4,650,506 | 3/1987 | Barris et al. ................ 55/487 |
| 4,695,300 | 9/1987 | Takagi . |
| 4,701,197 | 10/1987 | Thornton et al. . |
| 4,720,292 | 1/1988 | Engel et al. . |
| 4,758,460 | 7/1988 | Spicer et al. . |
| 4,976,759 | 12/1990 | Foltz . |

OTHER PUBLICATIONS

Ashrae Standard, Method of Testing Air-cleaning Devices used in General Ventilation for Removing Particulate Matter, p. 3, 1976.
1989 SAE Handbook pp. 24.45, 24.46 and 24.47.
T. Jaroszczyk, "Experimental Study of Nonwoven Filter Performance ... ", Particulate Science and Technology, vol. 5, pp. 271-287 (1987).
Clarke A. Rodman & Edward C. Homonoff; "Nonwovens in Filtration/Separation", Nonwoven Fabrics Forum (1988).
Material Safety Data Sheet for Silica Dust.

Primary Examiner—Charles Hart
Attorney, Agent, or Firm—Merchant, Gould, Smith, Edell, Welter & Schmidt

[57] ABSTRACT

Constructions and methods are described for collecting particulate material from gas streams. In one specifically described arrangement, a region of uniform or constant density depth media is oriented upstream of a region of gradient density depth media. In another, a preferred region of gradient density depth media is constructed, to effect particulate collection in a preferred manner. Preferred constructions described herein, utilize a pleated paper filter oriented downstream of depth media, to advantage.

18 Claims, 4 Drawing Sheets

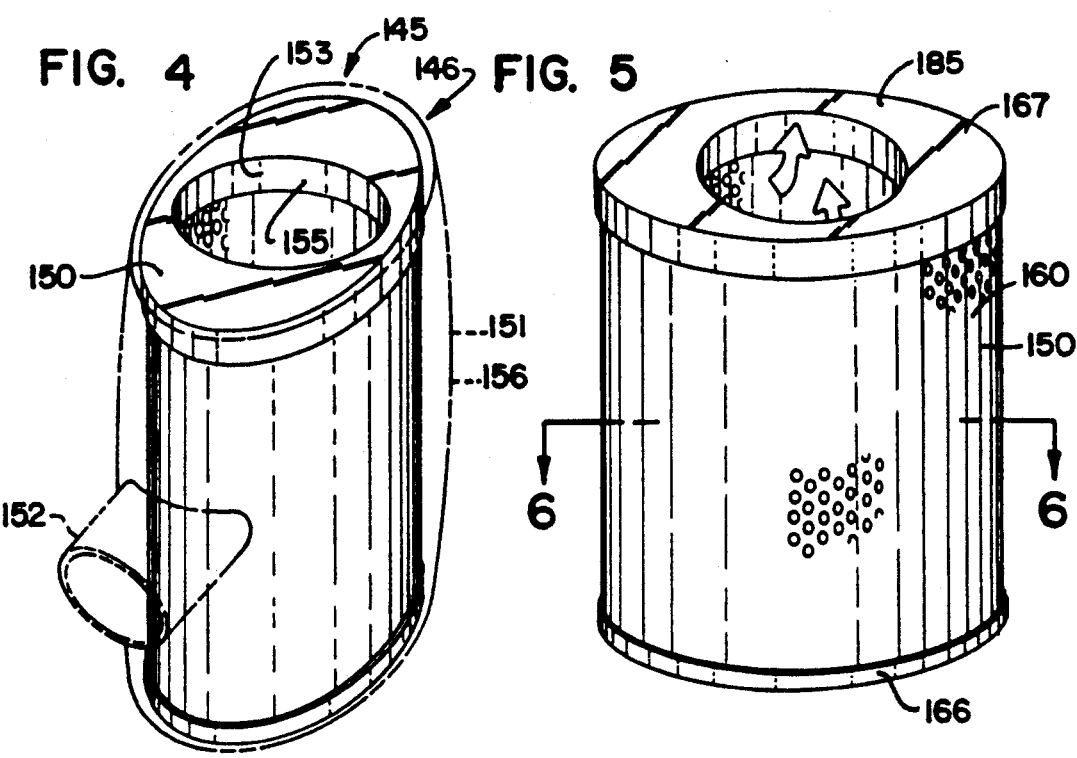
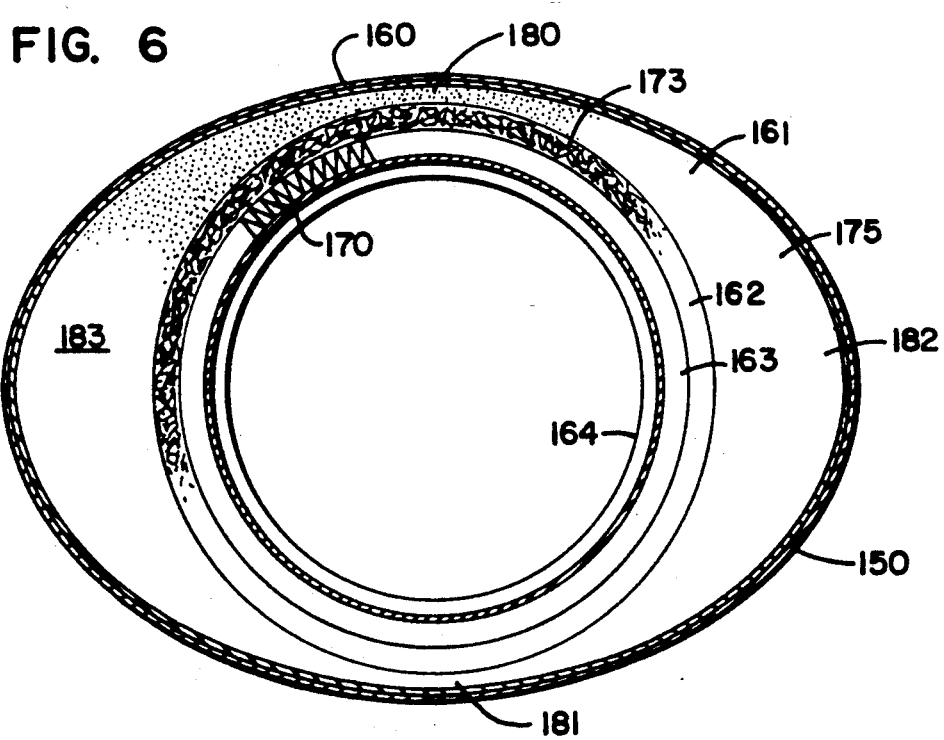

FILTRATION ARRANGEMENT AND METHOD

FIELD OF THE INVENTION

The present invention relates to filter arrangements. More specifically, it concerns arrangements for filtering particulate material from gas flow streams, for example air streams. The invention also concerns methods for achieving relatively efficient removal of particulate material from gas flow streams.

BACKGROUND OF THE INVENTION

Gas streams often carry particulate material therein. In many instances, it is desirable to remove some or all of the particulate material from the gas flow stream. For example, air intake streams to engines for motorized vehicles or power generation equipment, gas streams directed to gas turbines, and air streams to various combustion furnaces, often include particulate material therein. The particulate material, should it reach the internal workings of the various mechanisms involved, can cause substantial damage thereto. It is therefore preferred, for such systems, to remove the particulate material from the gas flow upstream of the engine, turbine, furnace or other equipment involved.

In other instances, production gases or off gases from industrial processes may contain particulate material therein, for example those generated by the process. Before such gases can be, or should be, discharged through various downstream equipment and/or to the atmosphere, it may be desirable to obtain substantial removal of particulate material from those streams.

A variety of air filter or gas filter arrangements have been developed for particulate removal. For reasons that will be apparent from the following descriptions, improvements have been needed for arrangements developed to serve this purpose.

A general understanding of some of the basic principles and problems of filter design can be understood by consideration of the following types of systems: a paper filter; a pleated paper filter; and, a constant density depth filter. Each of these types of systems is known, and each has been utilized.

Consider first a paper element, comprising a porous paper filter oriented perpendicularly to a gas stream having particulate material entrained therein. The filter paper selected will be one permeable to the gas flow, but of sufficiently fine porosity to inhibit the passage of particles no greater than a selected size therethrough. A simple, planar, filter construction made from such a material could in operation be oriented completely across the gas flow stream, for example between a source of air and an intake manifold for an engine. As the gases pass through the filter paper, the upstream side of the filter paper will receive thereagainst selected sized particulates in the gas stream. The filter will act to remove the particulates from the gas stream. The particulates are collected as a filter cake, on the upstream side of the paper filter.

A simple filter design such as that described above is subject to at least two major types of problems. First, a relatively simple flaw, i.e. rupture of the paper, results in complete failure of the system, and thus lack of protection of downstream equipment. Secondly, particulate material will rapidly build up on the upstream side of the filter, as a thin filter cake or layer, eventually substantially occluding the filter to the passage of gas therethrough. Thus, such a filter would be expected to have a relatively short lifetime, if utilized in an arrangement involving in the passage of substantial amounts of gas therethrough, with substantial amounts of particulate material above the "selected size" therein; "selected size" in this context meaning the size at or above which a particle is stopped by, or collects within, the filter.

The lifetime, of course, would be expected to be related to the surface area of the paper filter, the rate of gas flow through the system, and the concentration of particulates in the carrier stream. For any given system, the "lifetime" of a filter is typically defined according to a selected limiting pressure drop across the filter. That is, for any given application, the filter will have reached its lifetime of reasonable use when the pressure buildup across the filter has reached some defined level for that application.

An alternative design to that described above is a pleated paper filter. The arrangement of the filter paper in a pleated configuration, generally increases the surface area of filter media provided within a given cross-sectional area or volume of space. It will also tend to increase the strength of the system. Thus, the lifetime of the filter is increased, due to the increase of surface area for entrainment of particulate material thereagainst. However, as a thin layer of particulate material collects on the upstream surface the filter element, the filter will still tend to become occluded. Thus, the lifetime of such a filter is still relatively short, in many applications. In addition, the system is again subject to significant problems should a minor flaw or rupture develop in the paper element.

It is noted that in many applications, the gas stream to be filtered can be expected to have particulate material of a variety of sizes therein, and/or the equipment can be expected to be subjected to varying gas flow streams with respect to particulate content. Consider, for example, a filter arrangement designed for utilization in motorized vehicles. It will be preferred that the filter arrangements utilized for such vehicles be capable of filtering out particles ranging from a size of submicron sizes up to 100 microns. For example, vehicles utilized in off-road circumstances, at construction sites or at other sites (country roads perhaps) where a lot of dirt is carried in the air, can be expected to encounter gas streams carrying a substantial percent of about 10 to 100 micron material. Most of the air which passes through the air filter of an over-the-highway truck or automobile, when the vehicle does not encounter dust storms or construction sites, generally carries very little particulate material above about 5 microns in size, but does carry a substantial portion of submicron to 5 micron sized materials. A city bus, on the other hand, principally encounters only submicron sized carbon particles in the gases passing into the filter thereof. However, even city buses can be expected to at least occasionally encounter air having larger particles therein.

In general, filters designed for vehicles should preferably be capable of providing substantial protection to the engine for particles throughout a size range of submicron to 100 microns, regardless of what are expected to be the preponderant working conditions of any specific vehicle. That is, such arrangements should be developed such that they do not rapidly occlude, under any of a wide variety of conditions likely to be encountered during the lifetime of the vehicle. Such is true, of course, for any filter system. However, with respect to vehicles, the problem is exacerbated by the fact that the vehicle moves from environment to environment, and thus can be expected to encounter a wide variety of conditions. A "flexible" arrangement is preferred at least in part, so that one construction of filter can be put to use in a relatively wide variety of applications.

Consider again the paper filter and pleated filter arrangements described above. Filter paper (pleated or otherwise) provides an excellent filter for gas streams having mostly relatively small particle sizes, since filter paper can be prepared with very low porosity. However, should the gas stream passing through the filter be originally to contain (or change to contain) a substantial percentage of particles above the submicron size therein, or a relatively high population density of the submicron particles, the paper filter will relatively rapidly occlude, i.e. reach its lifetime through buildup of filter cake and generation of limiting differential. Thus, a given filter paper construction would not be expected to be a very effective system for filtering air under a wide variety of applications, especially with expectation of a relatively long lifetime. In addition, as explained above, paper filter arrangements do not in general provide good protection, in the event of failure. That is, even a minor rupture or tear can result in a nearly complete system failure.

In many applications, an alternative type of filter, generally referred to as a "depth" filter, is available. A typical depth filter is a thick layer or web of fibrous material referred to as "depth media." Depth media is generally defined in terms of its porosity, density or percent solids content. Typically, it is defined in terms of its solids content per unit volume, for example a 2-3% solidity media would be a depth media mat of fibers arranged such that approximately 2-3% of the overall volume comprises the fibrous material (solids), the remainder being air or gas space. Another useful parameter for defining depth media is fiber diameter. If percent solidity is held constant, but fiber diameter is reduced, pore size reduces; i.e. the filter will more effectively trap smaller particles.

A typical depth media filter is a deep, relatively constant (or uniform) density, media, i.e. a system in which the solidity of the depth media remains substantially constant throughout its thickness. By "substantially constant" in this context, it is meant that only relatively minor fluctuations in density, if any, are found throughout the depth of the media. Such fluctuations, for example, may result from a slight compression of an outer engaged surface, by a container in which the filter is positioned.

A problem with constant or uniform solidity depth media systems, is that they are not readily adapted for efficient filtering under circumstances in which air or gas flow with varying populations of particle sizes are likely to be encountered. If the percent solidity of the depth media is sufficiently high, relatively large particles will tend to collect in only the outermost or most upstream portions of the media, leading to inefficient utilization of the overall media depth. That is, under such circumstances the particles of solids (especially larger ones) tend to "load" on the front end or upstream end of the media, and do not penetrate very deeply. This leads to premature occlusion or a short lifetime. By "premature" in this context, it is meant that although the depth media volume is large enough for much greater "loading" of solids, occlusion resulted because the load was heavily biased toward the front end, and resulted in blockage (and pressure differential increase).

If, on the other hand, relatively low density depth media is utilized, a greater percent of its volume will tend to be loaded or filled by larger particles, with time. This may occur, for example, through redistribution as particle agglomerates initially formed in more upstream regions, break up and redistribute inwardly. Thus, at the "lifetime" or "limiting pressure differential" load would be more evenly distributed through the media depth (although completely uniform distribution is unlikely). However, relatively small particles would be more likely to have passed completely through such a system.

From the description, it will be apparent that constant density depth media is not particularly well suited for circumstances in which either: the population of particle sizes within the air flow extends over a relatively wide range; and/or, the air filter is likely to encounter a variety of air streams (conditions) presenting therein a variety of particle size distributions.

Very low density depth media, on the order of about 1-3%, and more typically about 1-2% solidity, is sometimes referred to as "high loft" media. Such media has been utilized as filter media in HVAC filters (heat, ventilation, air conditioning).

The term "load" and variants thereof as used above and referred to herein, refers to location of entrainment or entrapment of particles by the depth media filter.

As explained above, as the density (i.e. percent solidity) of the depth media is increased, under constant load conditions, after use the filter will tend to include a greater load toward the upstream side. Should the load conditions comprise air having a variety of particle sizes therein, or should the filter need to operate under a variety of conditions of use, no single density depth media has, in the past, been effective as a filter. That is, for any given percent solids depth media, the load pattern will differ depending upon the particle size distribution within the air or gas stream to be filtered. Thus, while the filter depth could be optimized for one particular particle size, it might not be sufficient for operation under a variety of conditions or with gas having a variety of particle sizes therein.

What has been needed has been a filter system adapted for relatively efficient load and a relatively long time of effective use, under a variety of circumstances. What has been particularly needed has been a filter which in use can well tolerate variances in particle size distributions, and gas streams passing therethrough; and, which can be readily applied to a variety of working systems.

SUMMARY OF THE INVENTION

Gradient Depth Media

Improvement over the utilization of constant density depth media can be obtained through the development of a gradient depth media filter system; that is, a system in which depth media is utilized instead of filter paper, but the depth media is not provided with a constant capability to trap solids throughout. One such preferred system involves depth media wherein the ability to trap particles (especially smaller ones) in general increases from an upstream side toward a downstream side. In typical applications, the ability to trap particles is increased by providing an increasing density (percent solids) gradient. It may also be accomplished through decreasing fiber size, with depth, or a combination of the two techniques. By "increase" in "ability to trap particles" in this context it is not meant that the inner layer necessarily does collect more particles, in the construction. It is merely meant that if the two layers were tested separately, upon exposure to test streams of dust, the outermost layer of the two would generally show less propensity, per unit volume, to trap or load, than the inner layer. Alternately stated, the innermost of the two layers being compared is constructed and arranged to more effectively trap smaller particles.

According to the present invention, a preferred gradient density depth media arrangement is provided, for utilization as a filter. The most preferred arrangement utilizes gradient density depth media positioned upstream from an associated pleated paper filter. Preferably the gradient density media includes at least four regions of different solidity, beginning with an outermost or most upstream region of about 1 to 2% solidity, and increasing up to a highest solidity of at least about 3 to 10%. Most preferably the arrangement includes at least about 5 to 10 layers. Preferably the arrangement is constructed such that no layer will collect or load with more than about 60% of the solids "loaded" on the filter construction or system, in use.

In preferred arrangements, no greater than about a 30-50% change in density is provided, between any two adjacent steps or layers. Also, preferably, except for the outermost stage, i.e. lowest solidity stage, no stage or region comprises more than about 25% of the overall volume of depth media. This is not meant to suggest that the outermost stage necessarily does comprise more than 25% of the depth media volume, only that it may.

In most preferred arrangement, utilizable as a vehicle filter, a cylindrical arrangement is provided which utilizes a five to six layer (of depth media) system oriented around a central pleated paper filter core. The layers of depth media are oriented with a gradient in density from a most upstream region of about 1 to 2% solidity increasing in density to an uppermost density for inner layers of about 5 to 10%, more preferably 5-7%. A preferred such arrangement is described herein below, in detail.

Gradient density arrangements such as those previously described are quite useful, particularly in specific purpose applications. For example, they may be used for over the highway trucks or buses, i.e. primarily for on road circumstances.

Gradient density arrangements are, however, somewhat limited in the application. They are not extremely flexible since the gradient, in general, is developed to accommodate an airflow stream having a particular (predicted) particle size distribution, or range of particle size distributions, therein. If the conditions of the use of vehicle change considerably, the gradient system may not be appropriately calculated to handle the load, and can prematurely clog. Thus, for example, a gradient density arrangement developed for over the highway use may not be appropriate should the vehicle be utilized off-road, or to a substantial extent on dirt roads. Certain preferred constructions of filter arrangements according to the present invention are more flexible with respect to this, as explained herein below.

Therefore, according to the principles described herein a filter construction is provided which has an upstream side and a downstream side, the filter construction being arranged for air flow therethrough from the upstream side to the downstream side, to collect particulates therefrom. The filter construction includes: a paper filter arrangement oriented substantially adjacent to filter construction downstream side; and, depth media filter arrangement oriented upstream of the paper filter arrangement. The depth media arrangement preferably comprises at least four layers of depth media each of which has a different percent solidity from at least three other layers of depth media within the depth media filter arrangement; the at least four layers of depth media including a most upstream layer of depth media. The layers of depth media within an arrangement should be arranged in stages oriented in downstream progression. None of the layers of depth media, except optionally the most upstream layer of depth media, preferably comprises more than about 25% of the volume of depth media in the depth media filter arrangement. Preferably the most upstream layer of depth media comprises no more than, and preferably less than 50% by volume of depth media in the depth media filter arrangement. Also, preferably the most upstream layer of depth media is a high loft depth media having a percent solidity of no greater than about 3% and preferably 1-2%; and, preferably at least a next three downstream layers of depth media from the most upstream layer of depth media each has a greater percent solidity than a next upstream layer of depth media; and, preferably each has a percent solidity no more than about 50% greater, preferably no more than about 30% greater, than a next upstream layer.

Filter lifetime

The principles of the present invention were developed at least in part in order to provide, in a relatively efficient manner, for an extended lifetime or relative long lifetime filter arrangement. In general, a filter arrangement has reached its lifetime, when a limiting pressure drop across the filter media is reached. During use, as particulate material loads on the filter, the filter increasingly resists gas flow thereacross. That is, the pressure drop across the filter tends to increase. For any specific application, the "limiting" pressure drop will be the point at which the filter needs to be, or should be, changed. For example, if the filter is being used as an air filter for an intake manifold of a truck, a pressure drop of about 20 to 30 inches of water will typically be the limiting pressure drop. For an automobile, typically about 20 to 25 inches of water will be the limiting pressure drop. In industrial ventilation systems, typically about 3 inches of water is the limiting pressure drop; and, for gas turbines typically about 5 inches of water will be the limiting pressure drop. In some industries or applications, limiting pressure drops are set in specifications applicable to the system, or through regulatory control. The above figures are reported to provide examples only.

Apparatus and Methods According to an Alternate Embodiment of the Present Invention Involving a Large Volume of Uniform Density Media Above, certain preferred systems according to the present invention were described, which utilize a gradient of depth media in a preferred manner. In this section, preferred filter arrangements utilizable to achieve even greater flexibility in improved lifetime of operation are described. While these arrangements utilize some of the technology of gradient arrangements therein, they differ substantially for reasons indicated herein below. As a result of the differences, they are generally more "flexible"; i.e. they generally perform well over a broader range of conditions, or they may be more readily adapted for use in arrangements of odd configuration. In many instances they will also be simpler and/or less expensive to construct.

According to this embodiment of the present invention there is provided a filter comprising an upstream region of substantially constant (or uniform) density depth media having a percent solidity of no greater than about 3% and preferably 1-2%; and, a downstream region of gradient density depth media. For the arrangement, preferably the region of constant density depth media is constructed and arranged for operational loading therein of at least about 65% by weight (and more preferably at least about 85%) of retained solids within the filter construction. The term "retained solids" in this context is meant to refer to the solids loaded within the filter during operation. The term "operational loading" is meant to refer to loading of solids (i.e. retention of solids within the filter construction as a result of the act of filtering gases such as air). The term is not meant to include within its meaning particulate material which passes completely through the filter construction.

The region of gradient density depth media is preferably constructed and arranged for operational loading therein of at least 50% by weight of retained solids not retained within the upstream region, but which are retained within the filter construction during use.

In preferred constructions, the filter arrangement is constructed and arranged such that the ratio of operationally retained solids in the upstream region of substantially constant density depth media to operationally retained solids in the downstream region of gradient density depth media is at least about 2/1, more preferably at least 5/1 and most preferably at least 8/1.

In certain preferred applications an outer liner is oriented adjacent an upstream side of the region of constant density depth media, and means are provided for securing the upstream side of the region of constant density depth media to the outer liner. This can inhibit collapse of the low solidity constant density depth media in the upstream region, during use. Advantage is obtained from this, as explained.

The arrangement may be provided in a variety of geometric configurations including: a cylindrical arrangement of circular cross-section; a cylindrical arrangement of oval cross-section; and, a flat construction wherein the air passes from one side through to another. A particularly advantages arrangement for certain applications is an arrangement having an oval cross-section, wherein the region of gradient density depth media is of circular cross-section, but the region of constant density depth media is provided with an oval cross-section. An advantageous such arrangement is depicted herein.

In preferred constructions a "polish" filter is provided downstream of the region of gradient density depth media. Preferably the "polish" filter is a cellulosic fiber or paper filter, and in a preferred construction a cylindrical fluted paper element is utilized.

Preferred constructions according to this embodiment of the present invention may also be defined with respect to: relative volume of the region of constant density depth media to the region of gradient density depth media; and, absolute volume (or thickness) of the region of constant density depth media and/or region of gradient density depth media. Specifications with respect to this are provided in the detailed descriptions herein below.

Therefore, according to the present invention there is provided a filter construction comprising an upstream region of substantially constant density depth media preferably having a percent solidity of no greater than about 3% (preferably 1-2%); and, a downstream region of gradient density depth media. For such an arrangements preferably the region of constant density depth media is constructed and arrangement for operational loading therein of at least 65% by weight of retained solids within the filter construction; and, the region of gradient density depth media is constructed and arrangement for operational loading therein of at least 50% by weight of retained solids not retained within the upstream region, but which are retained within the filter construction during use.

Preferred constructions according to the above description are constructed and arranged such that the weight ratio of operationally retained solids in the region of constant density depth media relative to the region of a gradient density depth media is at least 2/1, more preferably at least 5/1, and most preferably at least 8/1.

In most preferred constructions according to the present invention, a paper filter arrangement is oriented adjacent a downstream side of the region of gradient density depth media; and, the filter construction includes an upstream liner and a downstream liner, with selected regions of filter media oriented therebetween. In certain constructions, a region of constant density depth media may preferably be oriented outside of an upstream liner, i.e. upstream of an upstream liner, for advantages described herein.

Methods

According to the present invention there are also provided preferred methods for filtering particulate material from gas stream such as air streams. The methods generally concern providing filter arrangements (or utilizing principles) as described herein in a manner to obtain the preferred loading of solids which results, for example for the embodiments using a region of constant density depth media a preferred ratio of loading of solids in the constant density depth media region vs. the gradient density depth media. For preferred applications, as indicated, the method is conducted such that there is at least about a 2/1, more preferably at least 5/1 and most preferably at least 8/1 ratio of solids loaded in the upstream region of constant density depth media relative to the downstream region of gradient density depth media.

Therefore, according to the present invention a preferred method of filtering particulate material from a gas stream is provided. The method generally includes the following steps: (1) a step of collecting at least 65% by weight of total particulates collected from the gas stream in the process, in a constant density depth media having a percent solidity of no greater than about 3% and preferably no greater than about 1-2%; (2) a follow-up or downstream step collecting at least 50% by weight of total particulates collected from the gas stream but not collected during the step of collecting in constant density depth media, in a gradient density depth media; and, (3) a step of collecting remainder of total particulates collected in the gas stream with a paper filter, the step of collecting with a paper filter being conducted after the step of collecting with a gradient density depth media. Preferred applications of the methods described herein, will be apparent from descriptions herein of preferred constructions for utilization in affecting the dust collection.

BRIEF DESCRIPTION OF THE DRAWINGS

in FIG. 2, portions are broken away to illustrate internal detail.

FIG. 4 is a perspective view of an alternate embodiment of an air filter arrangement according to the present invention, FIG. 4 being of an element depicted somewhat similarly to that shown in FIG. 1.

FIG. 5 is a perspective view of a filter element from the arrangement depicted in FIG. 4.

FIG. 6 is an enlarged cross-sectional view taken generally along line 6—6, FIG. 5.

DETAILED DESCRIPTION OF THE INVENTION

Figure 1:
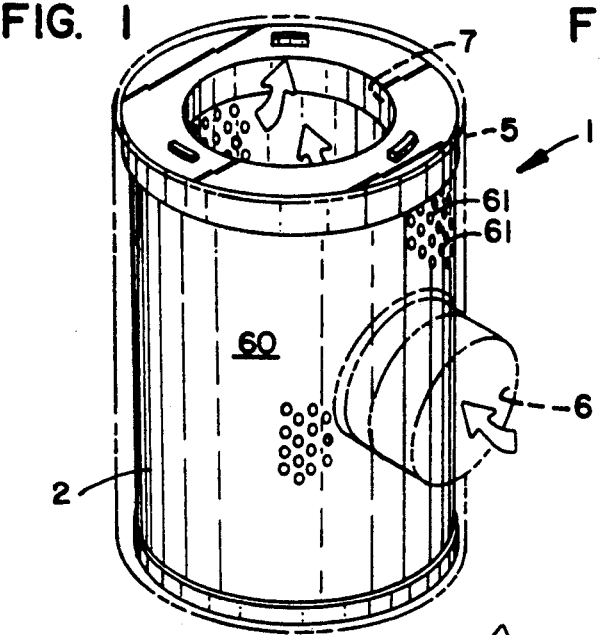
FIG. 1 is a perspective view of an air filter arrangement according to the present invention.

As required, the following detailed description is provided to facilitate an understanding of the principles of the present invention and their application. The invention, as presented herein and shown in the referenced drawings, is depicted in certain specific example exemplary embodiments. It will be understood that the principles of the present invention may be employed in a variety of contexts, and in a variety of specific embodiments. In the drawings, relative material thicknesses and component sizes may be shown exaggerated, to facilitate understanding.

The present invention will, in general be described in a specific application as a vehicle engine air filter. Filter arrangements according to present invention may be applied in a variety of systems, including not only as engine filters for moving vehicles, but as engine filters for other purposes, and in general as air or gas filters. The term "gas" as used herein will be generally meant to refer to air streams as well as other gaseous streams.

The reference numeral 1, FIG. 1, generally depicts a gas (air) filter arrangement for a vehicle or the like, involving a filter construction 2 according to the present invention. It is the filter construction 2 which results in a removal of particulate material in air flowing through air filter arrangement 1.

In FIG. 1, the filter construction 2 is shown positioned within a generally cylindrical housing illustrated in phantom at 5. The housing 5 includes an inlet 6 and a central outlet 7. Air to be filtered by filter construction 2 passes: (a) into the housing 5 through inlet 6; (b) through the filter construction 2; and, (c) outwardly from the arrangement by outlet 7. The arrangement 1 is a cylindrical arrangement, utilizing a cylindrical filter construction 2. Such systems, but for the specific filter construction 2 described herein, are well known and widely utilized. A variety of techniques for controlling air flow to obtain proper filtering within arrangements such as that shown in 1 are also well known. In addition, a wide variety of seal systems for attachment of such systems to equipment for use, have been developed.

Figure 2:
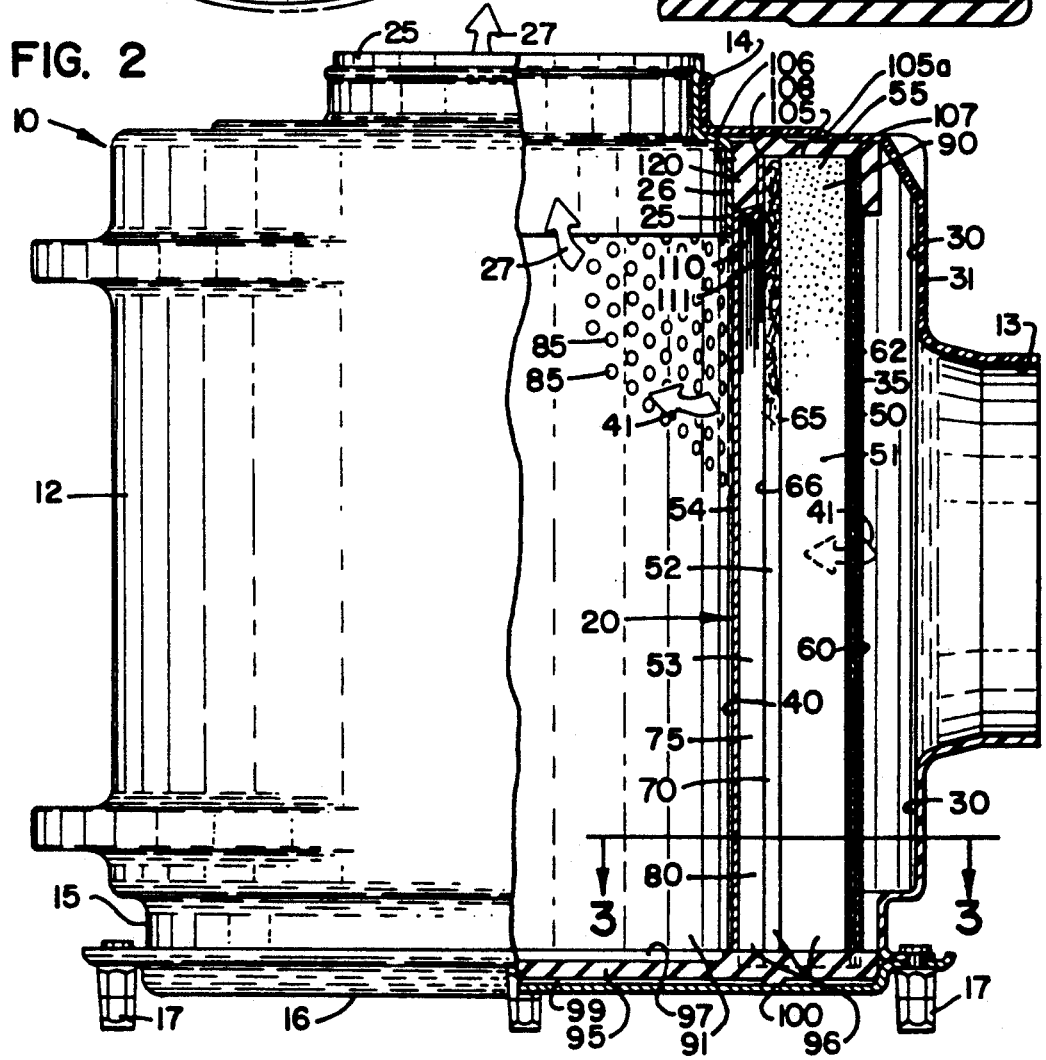
FIG. 2 is a side elevational view of the arrangement shown in FIG. 1, depicted in an environment comprising an air filter construction for a vehicle.

A specific arrangement 10 is illustrated in FIG. 2. Except for features relating to the filter construction of the present invention, arrangement 10 of FIG. 2 is generally as described in U.S. Pat. No. 4,720,292, incorporated herein by reference. U.S. Pat. No. 4,720,292 is owned by the assignee of the present invention.

Arrangement 10, FIG. 2, generally comprises a housing 12 having air inlet 13 and outlet 14. The housing 12 includes end 15 enclosed by cover 16. Cover 16, mounted by means of bolts 17, can be readily removed for access to internally received filter construction 20. Thus, for example, once arrangement 10 has been operated sufficiently long enough to reach the limiting pressure differential, i.e. its lifetime, cover 16 can be opened to obtain access to arrangement 20, for changing of same or for cleaning (whichever is preferred).

Arrangement 10 includes an outlet collar 25 received within the housing outlet 14. A radial seal at 26 provides for effective sealing to ensure that air passing into housing 12 must pass through filter construction 20, before escaping from the housing 10 along the path of arrows 27. Radial seals such as seal 26 are in general the subject matter of U.S. Pat. No. 4,720,292, referred to above. In FIG. 2 such an arrangement is depicted merely to indicate that a filter construction such as construction 20 according to the present invention may be adapted for utilization with such preferred radial seal arrangements, if desired. They may also be used in axial seal arrangements.

Still referring to FIG. 2, it will be apparent that housing 12 and inlet 13 are adapted in size such that an annular space 30 is formed between a housing outer wall 31 and an outer wall 35 of the filter construction 20. Preferably annular space 30 extends completely around filter construction 20 (FIG. 3), to provide for relatively even air flow distribution along the cylindrical outer wall 35 of the construction 20. This will facilitate relatively even loading of particulate material throughout the circumferential extent of arrangement 20. The effect is a relatively long lifetime.

Still referring to FIG. 2, the arrangement 10, and in particular filter construction 20, is of a cylindrical type. That is, arrangement 20 defines an internal, cylindrical, bore or region 40, toward which air (gas) to be filtered is passed, for example along the path identified by arrows 41. In passing from region 30 to bore 40, then, the air must pass through filter construction 20. Particulate material, in general, will be entrapped within filter construction 20; thus air passing outwardly from bore 40, along the path indicated by arrows 27, will have been filtered.

The preferred filter construction 20 illustrated in the embodiment of FIG. 2 and according to a preferred embodiment of the present invention includes the following components: an outer liner 50; a stage 1 region (at 51) of depth media; a stage 2 region (at 52) of depth media; a stage 3 region (at 53) comprising a pleated paper cylindrical filter; and, an internal liner 54. This arrangement leads to substantial advantage, especially with respect to loading and lifetime, as explained herein below.

The outermost, or most upstream, zone or stage 51 comprises a dust storage or loading zone. Preferably, filter construction 20 is constructed such that in normal use, and prior to or by the end of the filter element useful lifetime, at least about 65% and more preferably at least about 85%, by weight, of all solids "loaded" on the filter construction 20 will be "loaded", i.e. contained or retained, within that stage (51). For this to be obtained, under a relatively wide variety of use conditions, preferably stage 1 comprises a relatively high loft or low solidity depth media 55. That is, preferably stage 1, at 51, has a solidity of about 1-3%, more preferably less than about 2%. Also, preferably the depth media 55 utilized in the dust loading or outermost zone of stage 1, at 51, is of a substantially constant solidity throughout its depth, and is maintained as such throughout its use, i.e. is not substantially collapsed in use. By "substantially constant" in this context, it is meant that preferably within stage 1 there is no more than about a 20% variation in the density of the depth media 55 throughout its depth of extension within construction 20. More preferably, there is less than 10% variation, and the variation which occurs is only along outermost and innermost edges where other materials (for example outer liner 50) are encountered, and some minor compression may occur.

Preferably the material selected for use as depth media 55 is a web of material having fiber sizes in about the 20-45 micron range. Such materials can be readily obtained from commercial sources. One such material is a 1.5% solidity high loft media of polyester fibers having 2 fiber types therein, one of diameter 27-30 microns and the other of diameter about 39-43 microns, sold by Cumulus Fibers, Inc., of Charlotte, N.C., 28208, as product designation 100W067.

Referring again to FIG. 2, as previously indicated filter construction 20 includes immediately adjacent and upstream from stage 1 (at 51 comprising depth media 55) an outer or upstream support liner 50. Liner 50 is preferably prepared from a porous, relatively rigid, material not likely to collapse inwardly, i.e. in a downstream direction, under typical operating pressures and conditions for arrangement 10. Preferably liner 50 comprises a cylindrical piece of sheet metal 60 having a plurality of pores or apertures 61 (FIG. 1) therein, allowing for passage of air therethrough. In the alternative, a plastic material, such as relatively rigid polypropylene or polyethylene plastic may be utilized.

The outer or most upstream liner 50 can be utilized to serve a plurality of purposes. The two principal ones concern maintenance of integrity of filter construction 20 during handling and assembly, and, if desired, inhibition to collapse of the depth media 55 in stage 1, at 51, during operation (use). The former, it will be understood, results from the fact that liner 50 encloses the depth media 55, so that when filter construction 20 is handled, the fibrous material of depth media 55 remains contained. The latter concerns a unique feature of certain versions of filter construction 20, that will be understood from the following descriptions.

As explained previously, preferably depth media 55 in the stage 1 region, at 51, is a high loft material, i.e. a relatively low solids density material. In some applications, such material can collapse as it becomes loaded with large amounts of relatively large particulates. Under such collapse, the relatively high loft or low density character of the material would be partly lost, leading to less efficiency of solids storage in the construction 20. To counteract such a likelihood, for those applications in which collapse is foreseen to be a problem, the depth media 55, in stage 1 (at 51) is affixed or adhered to outer liner 50. This can be accomplished, for example, through the utilization of a thin layer of high tack adhesive, for example as shown at 62. The layer of adhesive 62 may be of any of a variety of types suitable to achieve affixation of the depth media 55 to liner 50, for example, by contact therewith. In this manner, the outer liner 50 will tend to inhibit collapse of depth media 55, under pressure. That is, liner 50 will operate as an upstream support for the depth media 55 in stage 1 at 51.

Still referring to FIG. 2, stage 2 (at 52) will generally be referred to herein as an intermediate zone. The intermediate zone 52 of filter material in filter constructions 20 according to the present invention is generally formed from a material sufficient to capture a substantial portion of remaining particulate material, of a size intended to be entrapped by filter construction 20, other than the material intended to be trapped within the stage 1 zone 51. In a typical preferred application, stage 2 is constructed to allow no more than about 6 or 7% of the total solids passing into filter construction 20, to pass therethrough. In many preferred applications, the region can be constructed to allow considerably less of the solids therethrough. In general, for preferred applications in which the stage 1 media is utilized to trap at least 85% of the solids load of the filter construction 20, stage 2 is constructed and arranged to retain (load) at least 50% and preferably at least about 70% of the remainder.

Preferably, the stage 2 zone, at 52, is constructed as a gradient depth media, with a density gradient from its outer or most upstream surface 65 in the direction of its inner or most downstream surface 66. Preferably the region comprises depth media having a lowest solidity, toward the outer surface 65, of about 1-2%; and, increasing in density up to a highest density of at least about 2-5%, near its innermost or most downstream surface 66. Such a gradient, for example, can be obtained by wrapping multiple layers of different density media, within region 52. In the alternative, or in combination, a single density depth media could be wrapped in layers under different tension (compression), to achieve a similar effect.

A wide variety of materials may be selected for use as the depth media in the stage 2 region at 52. An example would be to utilize a construction involving 3 layers, the innermost (or most downstream) two comprising polyester fibers of about 14.5 microns average thickness, solidity about 1.5-1.8% free state, such as the product 8643 available from Kem-Wove, Inc., Charlotte, N.C. 28241; the outermost (or most upstream) layer of material comprising 4.2 oz. polyester having the solidity (free state) of about 0.8-1.4% (also available from Kem-Wove). The materials would be installed (collapsed) so that the more upstream layer of the "8643" layers would have a solidity of about 1.5-2.0%, the next inner layer of "8643" would have a solidity of about 2-3%; and, the outermost layer of 4.2 oz polyester would have a solidity of about 1.2-1.5%. This can be accomplished, again, by appropriate compression of each layer.

The construction thus far detailed, with: outer liner 50; stage 1 at 51 as described; and, stage 2 at 52 as described, will generally be sufficient to provide for entrapment of substantially at least 90%–95%, by weight, of all particulate material necessary and desired to be trapped or operationally loaded within filter construction 20 during use. It is foreseen that in typical applications, it will be desirable to provide for a "polish" filter or safety filter within, or downstream of, stage 2. Such an arrangement can be utilized to protect the outflow stream 27, FIG. 2, from inclusion therein of any broken fibers or similar material from depth media 70, and also to trap any particulate material above the acceptable design limits for the airstream 27, that may have made its way through stage 1 at 51 and stage 2 at 52. In general, an excellent material for utilization as the "polish" filter, indicated as stage 3 at 53 in FIG. 2, is a paper filter 75. In such an application, the paper filter 75 will not be likely to prematurely occlude or lead to relatively short lifetime for the filter construction 20, since it will be responsible for catching only a relatively small amount particulate material, the majority of particulate material in the gas stream having been trapped or loaded in depth media of stage 1 at 51, and stage 2 at 52. One advantage to the arrangement is that failure of the paper filter is less likely to pose a substantial problem, than for conventional systems, since most of the solids are retained within the depth media.

Figure 3:
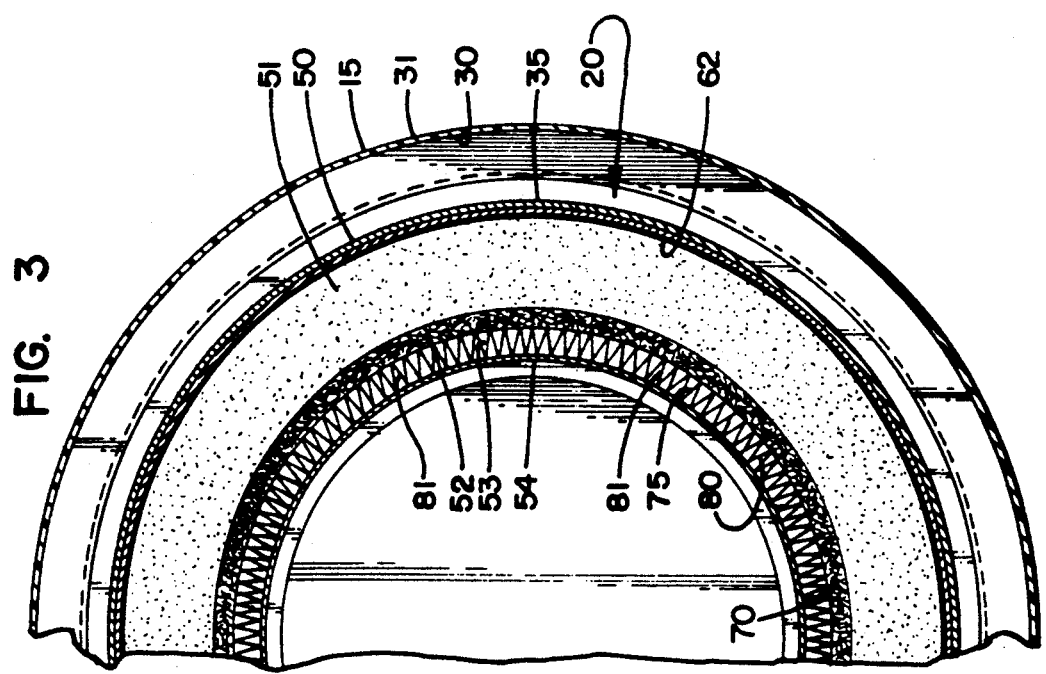
FIG. 3 is a fragmentary cross-sectional view taken generally along line 3—3, FIG. 2.

In FIG. 3, a cross-sectional view of a portion of FIG. 2, a preferred construction for paper filter 75 is illustrated. Preferably, paper filter 75 is a pleated paper filter 80 (FIG. 3). That is, for the embodiment shown it is a cylindrical arrangement formed from paper organized in continuous pleats 81, FIG. 3. For applications of the present invention as a vehicle filter, especially as organized with the generally cylindrical configuration as illustrated in FIGS. 2 and 3, it is anticipated that the paper filter 75 will be formed with pleats of about ¼ to ⅜ inch depth. Further, for such applications it is foreseen that paper filter material having a permeability of about 50–60 feet per minute (per ASTM D737-75 test standard) will be preferred, for the paper filter 75. A variety of such materials are known, including resin impregnated cellulosic filter media commercially available from Hollingsworth and Vose, East Walpole, Mass. and Ahlstrom Filtration, Chattanooga, Tenn.

Referring to FIGS. 2 and 3, for the arrangement shown there is no requirement for the pleated paper filter 75 to be bonded to the depth media 70 in stage 2, at 52. It is foreseen that in typical applications, there will be no such bonding at that interface.

For the arrangement shown in FIGS. 2 and 3, the downstream or internal liner 54 is positioned immediately inside of, or downstream from, the paper filter 75. Internal liner 54, shown with a generally cylindrical configuration in FIG. 2, provides support toward the inside (or downstream side) for filter construction 20, and in particular support for paper filter 75 against undesired collapse during handling and use. Preferably internal liner 54 is formed from a relatively rigid material such as sheet metal or plastic, substantially (or appropriately) porous to allow for substantially free passage of gases therethrough during use. Referring to FIG. 2, for the preferred embodiment described and shown, internal liner 54 comprises a sheet metal cylinder having a plurality of pores 85 therein.

For the cylindrical configuration of a filter construction 20 depicted in the embodiment of FIG. 2, and utilizing a radial seal 26 in the manner shown, a preferred end cap arrangement is used, to facilitate desired air flow. It will be understood from the following descriptions of the end cap arrangement, that advantage can be taken from the multilayer (i.e. stage 1, stage 2 and stage 3) configuration in arrangements according to the present invention, in order to achieve a greater or advantageous utilization of filter arrangement (or housing) internal volume. Details regarding this are provided herein below.

Still referring to FIG. 2, construction 20 includes first and second opposite ends 90 and 91. End 90 is the end positioned immediately adjacent outlet 14 for housing 12. End 91 is the opposite end, positioned adjacent cover 16.

End cap 95 is positioned at end 91. End cap 95 comprises a covering over end 91, to prevent passage of air therethrough. That is, in general end cap 95 prevents air from reaching internal bore 40 without passage through filter stages 51, 52 and 53 of filter construction 20. In a typical application, end cap 95 will comprise a covering of a cured polymeric resin material or the like, completely enclosing cylindrical ends 96 of stages 51, 52 and 53 of filter construction 20; enclosing adjacent portions of liners 50 and 54; and, also, enclosing end 97 of bore 40. Preferably end cap 95 includes an outer surface 99 having a projection 100 thereon, directed toward and into engagement with cover 16. By lightly compressing projection 100 between end cap 95 and cover 16, a secure mounting and retainment of the filter construction 20 in position can be achieved. This, in general, is analogous to the end cap system described in U.S. Pat. No. 4,720,292, referenced above.

Figure 9:
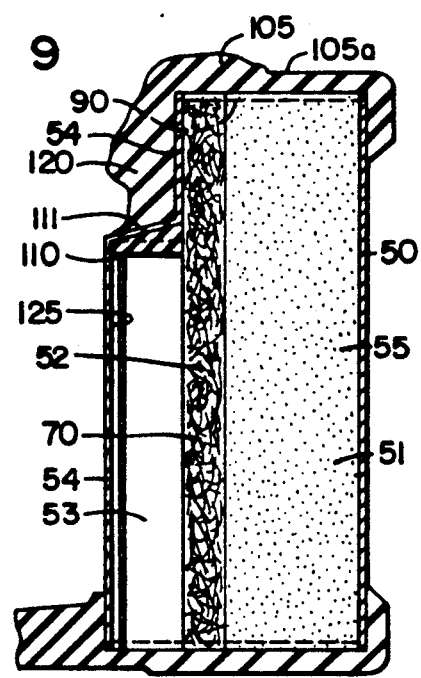
FIG. 9 is a fragmentary, schematic, cross-sectional view of a portion of the arrangement shown in FIG. 2, depicted with less detail for a more clear understanding of certain principles.

End 90 of filter construction 20 is enclosed by end cap 105 (FIGS. 3 and 9). For preferred embodiments, and unlike end cap 95, end cap 105 does not enclose the associated section of bore 40. Rather, end cap 105 is ring shaped, with a central bore, and encloses an outer cylindrical end 90 of filter construction 20, in order to prevent air from passing into bore 40 without passage through filter elements at stage 1, stage 2 and stage 3 of filter construction 20. End cap 105 defines an internal radial surface 106 which is used to form radial seal 26, with outlet collar 25, as described below.

For the particular embodiment described herein, end cap 105 comprises a polymeric material positioned in extension over depth media 55 of stage 1 (at 51) and depth media 70 of stage 2 (at 52). However, also for the preferred embodiment shown, pleated paper filter 75 terminates at 110 and does not extend as far upwardly (in FIGS. 2 and 9). Thus, paper filter 75 may not extend as deeply into end cap 105, if at all, toward surface 105a as do media 55 and 70. This provides an advantage, described herein below.

Still referring to FIG. 2, end cap 105 includes, received or embedded therein, a portion 107 of outer liner 50, and a portion 108 of inner liner 54. Portion 107 is positioned in extension above paper filter 75, as a result of internal bend 111 in liner 54. Since both liners, 50 and 54, are imbedded in both end caps, 95 and 105, a strong, easily handled, enclosed, system is provided.

Preferably, at least portion 120 of end cap 105, extending inwardly toward outlet collar 25 from internal liner 54, is a collar of relatively soft compressible material such as polyurethane foam or the like, readily compressible between collar 25 and liner 54 to develop radial seal 26. Such a seal may be generally as described in U.S. Pat. No. 4,720,292. It may be a composite.

The arrangement with respect to end cap 105, especially with respect to termination of portion 110 of paper filter element 75 differs substantially from the arrangement of U.S. Pat. No. 4,720,292. Advantage results from the differences. With respect to this, attention is directed to FIG. 9. FIG. 9 is a schematic illustrating portions of FIG. 2 relating to this feature of the invention, for clarity of description.

For the arrangement shown in U.S. Pat. No. 4,720,292, the filter paper element was not associated with depth media, and the element extended to a point which, for the arrangement illustrated in FIG. 2 and 9, would be adjacent the housing 12 near end cap 105. For the presently described arrangement, FIG. 9, such an extension is not required. Rather, the end cap 105 extends downwardly toward paper filter element 75 near bend 111.

This arrangement leads to advantage In prior arrangements such as that of U.S. Pat. No. 7,720,929, an extension of paper filter element within volume 125, FIG. 9 i.e. immediately "beneath" portion 120 of end cap 105 has not been feasible. This is because: (1) there needed to be left sufficient room for compression of compressible collar portion 120, adjacent the inner liner, for a tight radial seal; and, (2) because the filter paper needed to extend to region 105a. The present multilayered system, however, allows for utilization of a paper element which does not extend into region 105a, and thus the paper filter element can be oriented to encompass volume 125. A result is that the present arrangement can take greater advantage of, or make more efficient use of, space within a given housing 12, for filtering. It is noted that for the specific arrangement illustrated in FIGS. 2 and 9, extension of filter element 75 into volume 125 is facilitated by the bend 111 provided in internal liner 54.

Thus far, stages 1 and 2, regions 51 and 52 for the embodiment shown in FIG. 2, for a filter construction according to the present invention have generally been defined with respect to the percent of total "loaded" solids or particulates at lifetime for the filter arrangement, which would be found in each of the two regions. That is, the high loft region (stage 1) has been defined in general as being prepared from high loft material with sufficient thickness to result in retention of at least about 65% or more preferably at least about 85% of all retained solids in the system, at the system's lifetime; and, the gradient region, stage 2, has been defined as being prepared from the depth media having a gradient involving preferably about 1 to 5% solidity, and as being of sufficient depth to retain a substantial portion (at least 50%) of the remaining solids therein at lifetime, i.e. typically at least about 8-17% of total solids retained. Again, stage 3, the "polish" filter (while it is anticipated that at lifetime will have retained thereagainst some small amount of solids) is in general intended to be provided such that only a very small amount of solids, as a percent by weight of total retained or loaded solids, is found thereat, i.e. preferably less than 7% and most preferably less than 1% by weight. Preferably the ratio of retained solids in stage 1 to stage 2, for preferred systems, is at least 2/1, more preferably at least about 5/1, and most preferably at least about 8/1.

An alternate method of characterizing the various stages in a filter construction according to the present invention is by reference to the overall volume, of the total filter construction depth media volume, occupied by the various stages or regions. It will be understood that in general the total filter construction depth media volume available for loading of solids, is the volume represented by the stage 1 high loft material and the stage 2 gradient material, added together. It is foreseen that, in general, with high loft material as defined herein and gradient density depth media for stage 2 as described herein, for preferred applications the present invention the high loft material, i.e. stage 1 material, should occupy at least about 60%, preferably more than 70%, and most preferably at least about 80% of the overall volume represented by the stage 1 material and stage 2 material added together. It follows that most preferably the stage 2 material should represent no greater than about 40% of the overall volume of stage 1 material and stage 2 material added together.

In general, such an arrangement for filter constructions as described herein and generally prepared for utilization with a wide variety of particle sizes, for example as vehicle filters, will be effective in achieving the preferred load described herein, at limiting differential. This is advantageous, since it helps ensure that the limiting pressure differential will be achieved after rather an extended period of time, since load will be efficiently distributed through the system, and will not generate premature increase in pressure. It is also believed that with commercially available depth media materials, relative volumes as described reflect a cost effective way of achieving effective filtering.

To this point, filter constructions according to the present invention have in general been characterized at least: by construction in a manner to achieve preferred load, in certain regions or stages of the arrangement; and, with respect to approximate total and relative volume of filter taken up by materials in the various stages. It will be understood from the following discussions that these principles can be applied in a variety of manners, to a variety of filter constructions and configurations, to achieve significant advantage.

A Filter Construction Having a Generally Circular Cross-section

The arrangement illustrated in FIGS. 1, 2, 3 and 9 has a generally circular cross-section, FIG. 3. With such an arrangement, an alternative manner of defining construction of stage 1 and 2, is with respect to the average depth of the media in those two stages. This, in general, follows from the characterizations above, and shown in FIG. 2, reflecting that the filter construction depicted has a generally circular cross-section, with the various layers of the filter construction being cylindrical and of generally uniform depth.

Such arrangements are particularly well adapted for provision of filter constructions according to the present invention within conventional cylindrical housings, for example as vehicle filters. With such arrangements, preferred constructions according to the present invention can be defined, again, in terms of the thickness of depth media in the various stages. For cylindrical vehicle filters such as depicted in FIGS. 1, 2 and 3, it is foreseen that preferred constructions will involve high loft media in stage 1 having a thickness of at least about 50%, preferably at least 60%, more preferably about 70% and most preferably at least about 80% of the overall thickness of the two layers; the stage 2 depth media comprising the remaining depth media volume. For a typical cylindrical system such as that shown in FIGS. 1, 2 and 3, and made from materials having percent solidity as described herein above, a thickness of about 2.5 to 3.5 cm for the stage 1 media, and about 0.5 to 1.5 cm for the stage 2 media, would generally be sufficient and desirable for effective filtering, especially in vehicle filters.

Non-cylindrical configurations

The principles of the present invention can be applied to filter constructions having a variety of configurations, as opposed to the cylindrical configuration of FIGS. 1, 2 and 3. For example, a substantially flat, or nearly flat configuration could be utilized with the stage 1 depth media upstream and the stage 2 depth media immediately downstream. Such an arrangement might, for example, be utilized as an industrial air filter on an air conditioning system or the like. It may also be usable as a vehicle air filter, in a system configured for utilization of such an arrangement.

In general, for non-cylindrical configurations, the above described principles would apply. In particular, the arrangement would preferably be constructed with the depth media in each of stage 1 and stage 2 being generally as described above, and selected for operation as described above. In particular, a construction similarly defined with respect to: percent of solids load; nature of the depth media of the two stages; overall preferred volume of depth media in each of the two stages; and, for systems of uniform depth, overall depth for the two regions as described, would generally be preferred and operable.

Certain unique advantages in application of the principles of the present invention (as thus far described) will be apparent from an evaluation of the non-cylindrical embodiment of FIGS. 4, 5 and 6. In FIG. 4 a schematic, perspective, view of an air filter system 145 is depicted in sufficient detail for a general understanding of the advantages referenced above. The system 145 comprises a vehicle air filter system 146 having an air filter construction 150 therein through which air passes, for filtering, during use. It is noted that air filter construction 150 is generally oval in configuration, from top plan (or cross-sectional) view, and thus would typically be enclosed within an oval housing 151, depicted in phantom. An air inlet for housing 151 is depicted generally at 152. Outlet 153 allows for escape of filtered air. Outlet 153 for the arrangement shown in FIG. 4, is generally circular, and thus a radial seal can be provided along region 155 in conjunction with portions of an outlet arrangement, not shown. Such a system can be, for example, similar to collar 25 for the arrangement shown in FIG. 2. Housing 151 includes a slight outward bulge in central region 156, to facilitate air distribution therein with efficient utilization of overall housing volume.

A major difference between the construction shown in FIG. 4, and the construction shown in FIGS. 1, 2 and 3, is the overall oval cross-sectional configuration to the arrangement shown in FIGS. 4, 5 and 6, i.e. it presents an oval cross section taken in a direction substantially coplanar with a flow path of gas thereagainst or therethrough, during use. This presents a generally long, narrow, side elevation from a first view and a long, wide, elevation from a view at right angles to the first view. An air filter having such a configuration may be advantageous for positioning within an overall system having limited volume and presenting the shape of a rectangular volume, for example portions of the engine compartment of certain vehicles.

Referring to FIGS. 5 and 6, air filter construction 150 includes: an outer liner 160; a next inner stage 1 filter region at 161; a next inner stage 2 filter region at 162; a next inner stage 3 filter region at 163; inner liner 164; end cap 166; and, end cap 167.

Referring to FIG. 5, as previously indicated outlet 153 for the arrangement shown in FIGS. 4, 5 and 6 is generally circular. Such an arrangement is preferably configured through utilization of an associated circular (in cross-section) porous inner liner 164. Referring to FIG. 6, immediately outwardly, or upstream, from circular inner liner 164 is the stage 3 filter, at 163, preferably also circular in cross-section, i.e. a cylindrical, pleated paper filter 170. Immediately outwardly or upstream from paper filter 170 is the stage 2 filter material at 162, preferably comprising a gradient density depth media configured in a generally cylindrical form, i.e. with a circular cross-section, as indicated at 173. Immediately outwardly from, i.e. upstream from, cylindrical gradient density depth media 173, is the stage 1 material at 161, preferably comprising constant density high loft depth media as indicated at 175. As is understood by reviewing FIG. 6, media 175 is oriented to provide for the generally oval configuration, (rather a cylindrical configuration). Immediately externally, or upstream from, media 175 is the outer liner 160, also configured to accommodate the oval shape provided by media 175. The high loft media 175 may be affixed or adhered to the liner 160.

From review of FIG. 6, it will be apparent that the elements of air filter construction 150 are generally circular as indicated for the embodiment (at 20) of FIGS. 1, 2 and 3, but for: the configuration provided by filter material in stage 1 at 161; and, the accommodating shape of the outer liner 160.

In preferred embodiments, material in stages 1, 2 and 3 may be as generally described previously. That is, preferably stage 1 media is constructed and arranged such that at least about 65%, preferably at least 85%, of solids loaded upon air filter construction arrangement 150, when lifetime is reached, are loaded in the stage 1 region; and, preferably the arrangement is constructed and arranged so that a substantial portion the remaining loaded solids (preferably at least 50%) are found, at the lifetime of the arrangement, in stage 2 at 162. In addition, preferably the stage 3 material 163 operates as a polishing, protective, final filter. Also, in general, preferably the material in stage 1 at 161 is a high loft depth media generally as previously described with respect to the embodiments of FIGS. 1, 2 and 3, and the stage 2 depth media at 162 is preferably a gradient density depth media as described for stage 2 of the embodiment represented in FIGS. 1, 2 and 3.

Also, for preferred embodiments, preferably the relative volume taken up by stages 1 and 2 for the embodiment shown in FIG. 6 is generally analogous to that of the embodiment represented in FIGS. 1, 2 and 3. That is, preferably of the total volume represented by stages 1 and 2, stage 1 comprises no less than 50%, preferably at least about 60%, more preferably about 70%, and most preferably about 80% of the volume, with the material in stage 2 comprising the remainder of the volume. This, it will be understood by reference to FIG. 6, generally results in the stage 1 region 161 having relatively "shallow" opposite side regions 180 and 181; and, relatively "deep" opposite end regions 182 and 183.

Arrangements as illustrated in FIG. 6 have been constructed for evaluation. Surprisingly, it has been found that such systems operate with substantially the same lifetime as similarly constructed, but circular, systems such as those depicted in FIGS. 1, 2 and 3. In other words, it was not found that the relatively thin portions of depth media in stage 1 at regions 180 and 181 result in premature increase in pressure differential, i.e. an early achievement of filter lifetime, prior to efficient utilization of the relatively thick regions at 182 and 183 for particle load. While no particular theory with respect to this observation is asserted herein, it may be that an arrangement as illustrated in FIG. 6 allows for sufficient redirection of air through the thick portions 182 and 182, as the thin portions 180 and 181 become occluded, to accommodate relatively long lifetime and efficient loading. The observed loading is highly advantageous, again, as it means that an efficient, relatively long lifetime, system can be constructed without a circular outer configuration. This can lead to advantageous use of space, since the oval configuration may be fit into some engine regions or compartments too narrow to accommodate a circular construction. It is noted that, again, the arrangement of FIG. 6 can readily be viewed as involving the same volume of stage 1 material at 161, as the volume of stage 1 material for the embodiment of FIGS. 1, 2 and 3; the difference in FIG. 6 being the location (geometric arrangement) of the volume of depth media in region 161.

In most other manners, the arrangement of FIGS. 4, 5 and 6 may be generally similar to that illustrated in FIGS. 1, 2 and 3, especially with respect to the nature of end caps 166 and 167, but for the overall oval configuration; and, with respect to not directing the inner paper filter 170 too far upwardly into the outlet end cap 167 toward surface 185, thereby making a more efficient utilization of internal volume.

In one manner, the arrangement of FIGS. 4, 5 and 6 may differ from the arrangement of FIGS. 1, 2 and 3 in a minor aspect. Because side regions 180 and 181, of high loft material, are so thin relative to thicker regions 182 and 183, it may be difficult to form the arrangement of FIG. 6 without some stretching of the high loft material in regions 180 and 181, i.e. without some collapse of depth media therein to a greater percent solidity. It is foreseen that in preferred embodiments it will be desirable to minimize such collapse, however, available manufacturing techniques may not allow for ready construction without some stretching and collapse thereat. Thus, in regions 180 and 181 the media of stage 1 may not be constant solidity by comparison with the major percent of media in stage 1.

Figure 10:
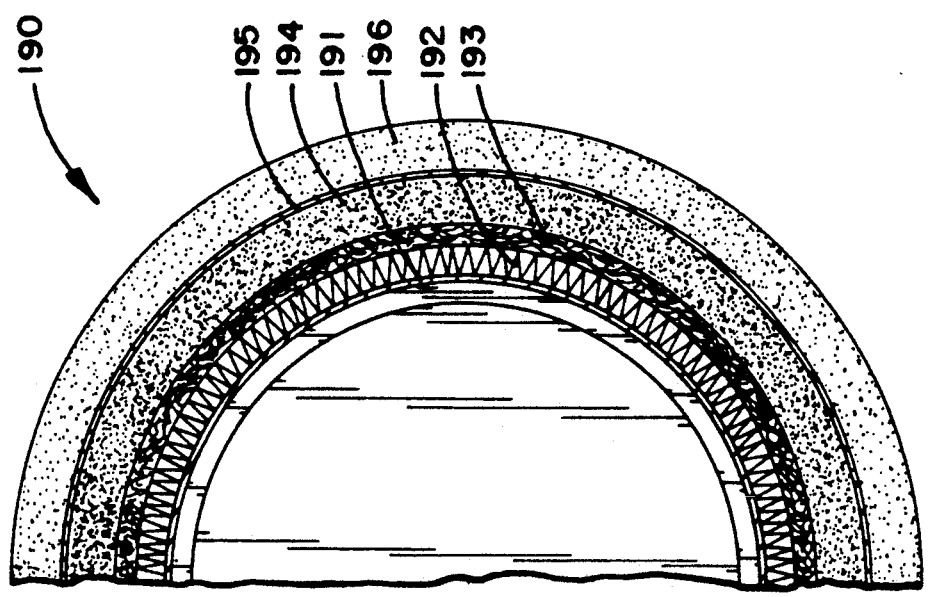
FIG. 10 is a view analogous to FIG. 3, of an alternate embodiment.

An alternate application of the principles described herein is presented by FIG. 10. FIG. 10 is a schematic representation, and may comprise an element generally analogous to that described with respect to FIG. 3. It is intended to reflect, however, a different construction for the most upstream, or outermost, region of constant density depth media, i.e. high loft depth media.

More specifically, as previously explained most of the solids load will occur in the high loft region. In some preferred embodiments, therefore, the filter member may be constructed as illustrated in FIG. 10 so that as portions of the high loft depth media become prematurely occluded, they can be replaced while leaving the remainder of the filter construction in tact.

Referring more specifically to FIG. 10, filter arrangement 190 includes inner liner 191, fluted paper filter element 192, gradient density region 193, high loft uniform density region 194, outer liner 195, and yet a further outer layer of high loft uniformed density material 196. Added together, regions 194 and 196 should be constructed to operate analogously the to stage 1 region for the arrangement of FIG. 2. In use, the outer most layer 196 of high loft density material can be removed or replaced without affecting construction of materials within liner 195. Alternately phrased, outer layer 196 is a "wrap" around an outside of the construction retained by liner 195. Materials utilized within the various layers may be as previously described. The end caps may be as previously described, except they would not have embedded therein the "wrap" 196.

An Embodiment Involving a Depth Media Stage for a Gradient Throughout More than 50% of Its Volume In the section above entitled Summary of the Invention, an application of principles to the present invention in providing an embodiment using a gradient to a greater extent described. Thus far, in the detailed description the invention, the arrangements described involved a region of uniform density depth media (at least 50% and preferably at least about 60% by volume) as an outer layer to a region of gradient density depth media. In general, herein such arrangements will be characterized as involving an outermost region of uniform density depth media that comprises greater than 50% of the overall volume of depth media and which in use retains at least about 65% of retained solids within the overall construction. Such arrangements, especially if prepared and configured as described herein above, provide advantageous general purpose filter systems. For example, a vehicle air filter constructed and arranged as explained above could be utilized not only in over the highway use, but also for substantial periods of time on dirt roads, at construction sites, in dust storms, etc.

It is foreseen that an advantageous filter arrangement can be developed, for certain uses, wherein the outermost or most upstream region of uniform density material comprises a substantially smaller portion of the overall depth media volume. This will require, however, a change in the relative natures of the layers in the gradient region. Now specifically, in such situations, the overall depth media should be staged with at least 4 and preferably at least 5 or 6 steps of density moving from an upstream portion to a downstream portion. Herein such an arrangements will generally be referred to as overall gradient arrangements, distinguishing them from the arrangements described in the previous section, i.e. using a large percentage of depth media volume for a uniform density material.

Gradient arrangements such as the preferred arrangements described herein, will not be as suitable for wide use as those involving a large volume of high loft uniform density material on an upstream side. Reasons for this have previously been explained, and generally involve the fact that while gradient arrangements may be well suited and calculated for use with flow streams having a particular particle size distribution therein, they may not suitable for general purpose use where occasionally large amounts of relatively large particle sizes may be encountered. It is foreseen, however, that if extreme conditions, for example construction sites, dirt roads, etc., are not likely to be encountered for substantial periods of time, a gradient density system can be well used as a vehicle filter. Further, such systems may be useful as gas turbine filters, etc., whereat a relatively constant particle sized distribution is expected, and extreme conditions are not likely to be encountered.

Figure 11:
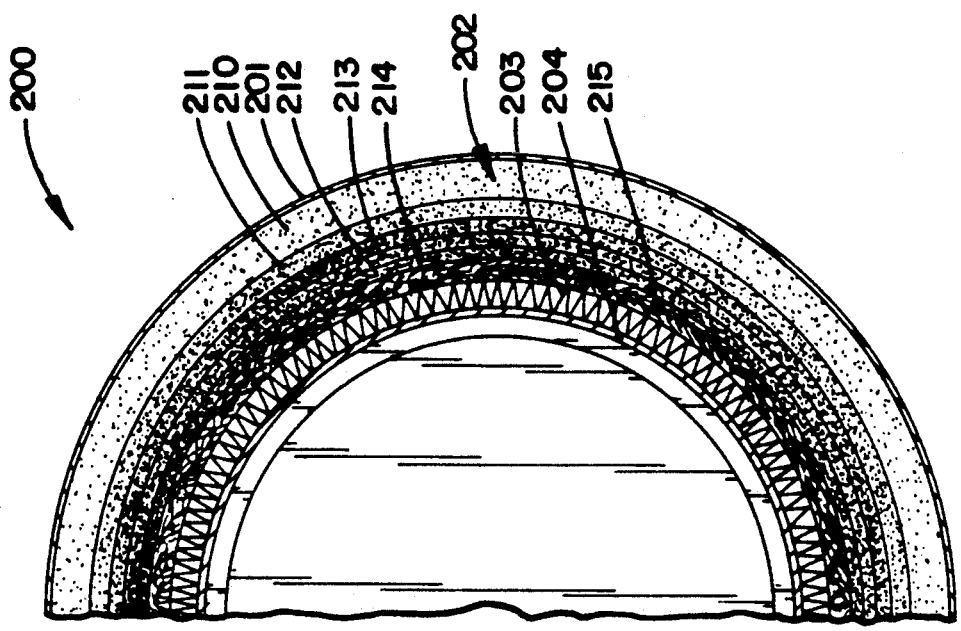
FIG. 11 is a view analogous to FIGS. 4 and 11, of a gradient density arrangement.

Attention is directed to FIG. 11, which through utilization of a cross-section of use similar to that presented for FIGS. 3 and 10, reflects a preferred gradient arrangement. In FIG. 11, a fragmentary cross-sectional view of a cylindrical filter arrangement 200 is provided. The arrangement 200 includes a porous outer liner 201; a volume of depth media 202; a pleated paper polish filter 203 immediately inside of, or downstream of, volume 202; and, inner liner 204.

The arrangement illustrated in FIG. 11 utilizes six stages of media in volume 202, indicated from our most upstream to most downstream stage at, respectively, 210, 211, 212, 213, 214 and 215.

Preferably each of the stages present in region 202 can be characterized as follows: no stage or region of a given density represents more than 50% of the volume of region 202; the outermost region 210 is provided with a lowest percent solidity; except for the outermost region 210, no stage or region comprises greater than 25% of the overall volume represented at 202 and comprising the depth media. Preferably at least four, and most preferably all, of stages 210-215 reflect increasing steps of density or ability to trap material, moving from an upstream side to a most downstream side. Preferably, no greater than about 30-50% change in density is provided, between any two adjacent steps or layers.

In a preferred arrangement, the regions begin with the density of about 1-2% in region 210, increasing in density to an uppermost density of about 5-10%, preferably 5-7%.

A preferred such arrangement for utilization as a vehicle filter is as follows: outermost region 210 comprises material 100W067 previously described, having a thickness of 1.28 cm and a percent solidity of 1.10%; region 211 comprises material 100W067 provided at a compressed thickness of 0.952 cm, and a percent solidity of 1.40%; region 212 comprises material 100W067 having a thickness of 0.826 cm and a percent solidity of 1.65%; region 213 comprises material 100W067 provided at a thickness of 0.58 cm and a percent solidity of 2.40%; region 214 comprises media 7333 available from Hollingsworth and Vose, East Walpole, Mass. and comprising polyester fibers of 24 micron average diameter, provided at a thickness of 0.147 cm and a percent solidity of 6.59%; and, region 215 comprises material 8643 provided at a thickness of 0.19 cm and a percent solidity of 5.44%. It is noted that the description given the percent solidity of the innermost region 215 is slightly lower than the percent solidity of the next outermost region 2/4%. However, the gradient is still maintained, since the fiber diameter of 8643 material is considerably smaller than 7333 material (14.5 vs. 24 micron average fiber size). The smaller diameter generally means that at about the same or reasonably close percent solidity, smaller pore sizes will be found in region 215 relative to 214, meaning a greater perpensity to trap material will be located thereat. The arrangement described would be provided for use as a vehicle filter with an internal diameter of about 15.6 cm.

Experimental Evaluations of Arrangements According to the Present Invention

Experiment 1

Figure 7:
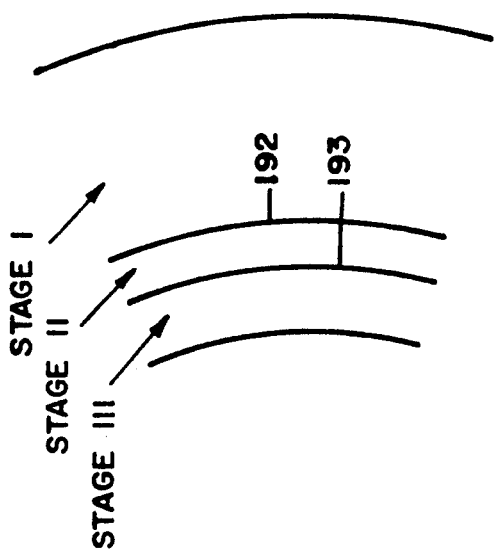
FIG. 7 is a schematic view of an air filter arrangement according to the present invention and utilized in one of the examples reported.

For evaluation purposes, an air filter construction using a region of uniform density depth and media and an inner region of gradient density depth media, according to the present invention was prepared and evaluated. In general, a cylindrical construction was selected for evaluation, with a generally circular cross-sectional configuration. The arrangement was generally as illustrated in FIGS. 2 and 3; however, it was not evaluated in a similar housing. A schematic representation of the arrangement prepared for testing, is generally illustrated in FIG. 7.

The filter member constructed generally had an outer diameter of about 10 inches, an inner diameter of about 6 inches and an overall length of about 16 inches. The schematic in FIG. 7, generally reflects arrangement of the stage 1, stage 2, and stage 3 materials, utilized in the test sample. The outermost zone 190, i.e. the stage 1 material, was prepared from about 1.5% solidity high loft media of polyester fibers, formed from two types of fibers, one having a thickness of about 27-30 microns, the other having a thickness of about 39-43 microns. The material utilized was obtained from Cumulus Fibers, Inc., Charlotte, N.C. 28208, product designation 100W067. Region 190 was prepared so as to be about 1.1 inches thick, and of substantially uniform solidity throughout.

The stage 2 region, indicated at 191, was prepared from three layers of depth media, having an overall thickness (in the construction) of about 0.56 inches, and was prepared in a form exhibiting a percent solidity gradient increasing from about 1.2% to about 2-5% therein, from the outermost surface 192 to the innermost surface 193. More specifically, three layers of material were wrapped coaxially, to form stage 2.

The outermost layer of stage 2, i.e. the most upstream layer of the material utilized in the stage 2 region of the test sample prepared, was made from a 4.2 oz. polyester depth media available from Kem-Wove under that designation. In the free state the material has a solidity of about 0.8-1.4%. The material was collapsed to approximately one-half of its free state thickness, when wrapped in the construction. The thickness of the material in the construction was approximately 0.3 inches.

The next inner layer of the three layers of stage 2 was a polyester depth media formed from fibers having an average diameter of about 14.5 microns and in the free state exhibiting a percent solidity of about 1.5-2.5%. The innermost of the three layers was formed from the same material. The overall thickness of the two layers together was about 0.26 inches when wrapped. This was estimated to be approximately two-thirds of the thickness of the material in the free state (i.e. solidity of about 2-3%). The material utilized for the innermost two layers of stage 2 was a material sold as commercial product number 8463 by Kem-Wove, Inc., of Charlotte, N.C. 28241.

From the above description of stage 2, it will be apparent that stage 2 was constructed in a manner having a gradient density, extending from about 1.2% to 2-5%.

The material utilized for the paper filter was a Donaldson Company proprietary media designated EN7.1.27. In general, the filter comprises a resin impregnated cellulosic media of about 70 lb. basis weight, permeability of about 50-60 feet per minute. The material was formed into a pleated arrangement having a pleat depth of about ⅜ inches.

The general test procedure used is found in SAE J726 at page 24,46. For test purposes, the filter was installed in an open air test chamber. An air flow having test dust therein was directed through the arrangement from the exterior to the interior of the construction. The air flow through the arrangement was about 700 cubic feet per minute. The air fed through the system included SAE fine test dust therein. This material is standardized test dust of or silicon dioxide having a particle size distribution by weight percent: 0-5 microns, 39%±2%; 5-10 microns, 18%±3%; 10-20 microns, 16%±3%; 20-40 microns, 18%±3%; 40-80 microns, 9%±3%; and, 80-200 microns, negligible. An SAE test dust is available from Powdered Technology Inc., Burnsville, Minn. 55337. The arrangement was run until a 25-inch restriction, i.e. pressure differential of 25 inches of water, was measured.

The arrangement was then disassembled and examined. It was found to contain about 3504 grams of particulate material therein, corresponding to a particulate removal efficiency of 99.914%. About 85-95% of the loading was found to have taken place in the outermost stage, i.e. region 190. This primarily comprised 1-10 micron particles. In the intermediate stage at 191, about 4% of the loading took place. This comprised principally smaller particles that were able to get through the outermost region. Very little loading, less than 1%, was observed on the surface of the filter paper 193.

Experiment 2

Figure 8:
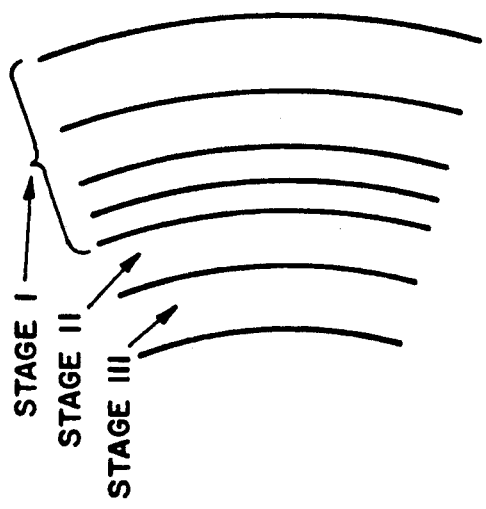
FIG. 8 is a schematic view representing a gradient density air filter arrangement.

For purposes of general comparison, tests were conducted with arrangements prepared with a gradient density throughout, rather than the construction described with respect to FIG. 7. A schematic of this arrangement (prepared for comparison) is generally reflected in FIG. 8. In FIG. 8, the arrangement of various stages are illustrated. Stage 2 was similar to that described above for FIG. 7, except only one layer of material 8643 was used; i.e. the layer was equally thick to the two layers used for the previously described test. Stage 3 was generally as described above for FIG. 7. Stage 1, on the other hand, was prepared to have a gradient density extending therethrough, from about 1.3% solidity up to about 3.9% solidity.

In general, the gradient density of stage 1 was prepared through utilization of 4 layers, i.e. 4 plies, of the 100W067 material previously described. Differences in density were obtained by more tightly collapsing the material in the inner layers. This was accomplished by laying each layer of material on a netting, and adjusting the tension of the netting while wrapping the netting around the cylindrical core comprising stages 3 and 2. In general, tighter tension leads to more collapse of the ply, thus a higher percent solidity for that ply. The solidities for each layer, outer to inner, for stage 1 are estimated to have been as follows: 1.1%, 1.4%, 1.6% and 2.4%.

No specific effort was made to generate gradient density test samples perfectly identical to the test sample discussed above with respect to FIG. 7, but for the differences described. However, in general the outside diameters, thicknesses of stages 1, 2 and 3, and inside diameter were about the same. The overall length of the test samples of the system shown in FIG. 8 varied plus or minus about 10%, relative to the specific length of the FIG. 7 test described above. However, the comparative figure stated below for loading, results from normalization to a theoretical construction of similar length, based on observed data.

For the arrangements described above and in accordance with FIG. 8, considerable loading of solids was observed, at the limiting lifetime. On the average about 20% less material was loaded (the 20% figure resulting from normalization for length), at lifetime, than for the arrangement made according to FIG. 7. Efficiency of removal was calculated to be about the same, however.

Definition of Arrangements According to the Present Invention by Performance Under Tests Conducted With Test Dust It will be understood that although laboratory tests conducted with test dust are themselves reproducible, they do not necessarily precisely reflect performance in the field. There may be a number of reasons for this, including variations in the particular composition of air in the field, versus the relatively constant particulate distribution maintained during the test conditions. In general, arrangements according to the present invention can be characterized in terms of performance with respect to test dust. One particular test dust utilizable in characterizing vehicle filter arrangements and gas engine generator filter arrangements, i.e. arrangements intended to perform up to a pressure differential of about 20-30 inches of water, is SAE fine test dust previously characterized herein. A useful material as a test dust for testing filter arrangements for using gas turbine arrangements or air conditioner arrangements, etc., i.e. arrangements intended to operate up to about pressure differential about 5 inches of water, is ASHRAE test dust. ASHRAE synthetic dust consists of 72% standardized air cleaner test dust fines, 23% by weight Molocco Black; 5% by weight number 7 cotton linters ground in a Wiley mill with 4 mm screen. Such a material is characterized in ASHRAE standard 52-76, incorporated herein by reference. (ASHRAE refers to the American Society of Heating, Refrigerating, and Air Conditioning Engineers, Inc., 345 E. 47th Street, New York, N.Y. 10017.) Such a material is available, for example, from Fisher Scientific, Pittsburgh, Pa. 15219.

A preferred vehicle air filter generally analogous to the arrangement shown in FIGS. 3 and 6, and constructed and arranged according to the principles of the present invention, when exposed in testing to SAE fine test dust, and operated up to a pressure differential of about 20-30 inches of water, will perform as generally characterized herein with: 65% preferably 75-95% of retained solids found in stage 1; no greater than about 7% of solids retained against the paper filter element; and, the remaining of solids found in stage 2.

When arrangements according to FIG. 11, a gradient density arrangement utilizable as vehicle air filter, is tested with SAE fine test dust and operated up to a pressure differential of about 20-30 inches of water, preferably no greater than about 50-55% of the solids is found in the outermost region of the gradient density arrangement, and the total of about 90-95% of the solids are retained within the depth media, the remaining being retained against the paper filter.

When an arrangement constructed according to the present invention and utilizing a relatively large stage 1 region of uniform density depth media according to the descriptions associated with FIGS. 1-7, is prepared for utilization as a gas turbine filter, and then preferably when tested with ASHRAE test dust composition as characterized herein up to pressure differential of about 5 inches of water, at least about 65% and most typically in preferably about 80-95% of the solids are retained or found in the stage 1 material, no more than about 10% of the retained solids are found against the paper filter elements; and, the remainder of the retained solids are found in the stage 2, gradient density, region. It is foreseen that preferred gas turbine arrangements will often be operated with a construction generally analogous to that shown in FIG. 10, with a removable and replaceable outer portion of uniform density depth material. It is foreseen that this portion of the uniform density depth material will be responsible for retaining the vast majority of solids found in the uniform density portion.

We claim:

1. A filter construction comprising:
   (a) an upstream region of substantially constant density depth media having a percent solidity of no greater than about 3%; and
   (b) a downstream region of gradient density depth media;
      (i) said region of constant density depth media being constructed and arranged for operational loading therein of at least 65% by weight of retained solids within said filter construction; and
      (ii) said region of gradient density depth media being constructed and arranged for operational loading therein of at least 50% by weight of retained solids not retained within said upstream region, but which are retained within said filter construction.

2. A filter construction according to claim 1 constructed and arranged such that the ratio of operationally retained solids in said volume of said region of constant density depth media to said region of gradient density depth media is at least about 5 to 1.

3. A filter construction according to claim 2 including:
   (a) an outer liner oriented adjacent an upstream side of said region of constant density depth media; and
   (b) means securing said upstream side of said region of constant density depth media to said outer liner.

4. A filter construction according to claim 1 including:
   (a) an outer liner oriented adjacent an upstream side of said region of constant density depth media; and
   (b) means securing said upstream side of said region of constant density depth media to said outer liner.

5. A construction according to claim 1 wherein:
   (a) said region of constant density depth media is provided with a substantially oval cross-section taken in a direction substantially coplanar with a flow path of gas against said construction, during use.

6. A construction according to claim 5 wherein:
   (a) said region of gradient density depth media is provided with a substantially circular cross-section taken in a direction substantially coplanar with a flow path of gas against said construction, during use.

7. A construction according to claim 6 including:
   (a) a cylindrical paper filter oriented adjacent a downstream side of said region of gradient density depth media.

8. A construction according to claim 7 wherein said paper filter comprises a fluted paper filter.

9. A construction according to claim 1 including:
   (a) a paper filter oriented adjacent a downstream side of said region of gradient density depth media.

10. A construction according to claim 9 wherein said paper filter comprises a fluted paper filter.

11. An arrangement according to claim 9 including an inner liner oriented adjacent a side of said paper filter opposite from said region of gradient density depth media.

12. A filter construction according to claim 1 wherein:
   (a) said upstream region of substantially constant density depth media has a percent solidity of no greater than about 2%; and,
   (b) said upstream region of substantially constant density depth media comprises two layers of material separated by a porous liner.

13. A filter construction according to claim 1 wherein:
   (a) said upstream region of substantially constant density depth media has a percent solidity of no greater than about 2%; and,
   (b) said downstream region of gradient density depth media has a percent solidity increasing from about 1-2% up to at least about 2-5% in transition from a most upstream portion to a most downstream portion.

14. A filter construction according to claim 13 wherein said upstream region comprises at least 60% by volume of depth media in said filter construction.

15. A filter construction according to claim 1 wherein said upstream region comprises at least 60% by volume of depth media in said filter construction.

16. A filter construction according to claim 1 wherein said upstream region comprises at least 70% by volume of depth media in said filter construction.

17. A filter construction having an upstream side and a downstream side; said filter construction including:
   (a) a paper filter arrangement oriented adjacent said filter construction downstream side; and,
   (b) a depth media filter arrangement oriented upstream of said paper filter arrangement; said depth media arrangement comprising:
      (i) at least four layers of depth media each of which has a different percent solidity at least the other from three of the at least four layers of depth media within the depth media arrangement; said at least four layers of depth media including a most upstream layer of depth media and being arranged in stages oriented in downstream progression;
      (ii) none of said layers of depth media, except optionally said uppermost layer of depth media, comprising more than 25% by volume of depth media in said depth media filter arrangement;
      (iii) said most upstream layer of depth media comprising less than 50% by volume of depth media in said depth media filter arrangement;
      (iv) said most upstream layer of depth media having a percent solidity of 1-2%; and,
      (v) a next three downstream layers of depth media from said most upstream layer each having a greater percent solidity than a next upstream layer; and, each having a percent solidity no more than about 50% greater than a next upstream layer.

18. A method of filtering particulate material from a gas stream; said method including the steps of:
   (a) collecting at least 65% by weight of total particulates collected from the gas stream in a constant density depth media having a percent solidity of no greater than about 2%;
   (b) collecting at least 50% by weight of total particulates collected from the gas stream but not collected in the constant density depth media, in a gradient density depth media; said step of collecting in a gradient density depth media being conducted after said step of collecting in a constant density depth media; and, (c) collecting a remainder of total particulates collected from the gas stream with a paper filter; said step of collecting with a paper filter being conducted downstream from said step of collecting in a gradient density depth media.

* * * * *

UNITED STATES PATENT AND TRADEMARK OFFICE
CERTIFICATE OF CORRECTION

PATENT NO. : 5,082,476

DATED : January 21, 1992

INVENTOR(S) : Kahlbaugh et al.

It is certified that error appears in the above-identified patent and that said Letters Patent is hereby corrected as shown below:

Col. 26, Line 36, insert -- from -- after "solidity";

Col. 26, Line 37, delete "from".

Signed and Sealed this

Twenty-fourth Day of September, 1996

Attest:

BRUCE LEHMAN

Attesting Officer

Commissioner of Patents and Trademarks